United States Patent Office 3,763,246
Patented Oct. 2, 1973

3,763,246
PROCESS FOR PRODUCING MANNITOL
Albert J. de Berardinis, Wilmington, Del., assignor to
ICI America Inc., Wilmington, Del.
No Drawing. Continuation-in-part of abandoned application Ser. No. 827,897, May 26, 1969. This application Mar. 9, 1970, Ser. No. 17,884
Int. Cl. C07c 31/26
U.S. Cl. 260—635 C
10 Claims

ABSTRACT OF THE DISCLOSURE

An improved yield of mannitol is obtained when the hydrogenation of invert sugar is carried out as a two stage process, the first stage being alkaline and occurring at a feed pH of 8-10 and the second being acid and occurring at a pH less than 6. This process also proceeds at high reaction rates causing said process to be more economical.

---

This is a continuation-in-part of application Ser. No. 827,897, filed May 26, 1969, now abandoned. This invention concerns an improved process for the production of polyhydric alcohols. More particularly this invention relates to an improvement in the production of mannitol from inverted sucrose.

The fact that catalytic hydrogenation of sucrose or inverted sucrose yields a mixture of mannitol and sorbitol is old in the art, U.S. Pat. No. 2,759,024. However, under the reaction conditions for these processes the yield of mannitol is usually from 24 to 26% of the reaction product. Heretofore, when the yield of mannitol was increased beyond this range, as in U.S. Pat. No. 3,329,729, it has been done by sacrificing the rate of reaction. The process of this invention will increase the mannitol yield beyond the normal 24 to 26% range and not sacrifice any reaction rate.

It is an object of this invention to increase the yield of mannitol from inverted sucrose.

It is also an object of this invention to increase said mannitol yield with no loss in reaction rate.

These objects and other objects will become evident to those skilled in the art from the following detailed description of the invention.

In general, the process of this invention entails continuously reacting an aqueous solution of partially inverted sucrose (sugar) slurried with an active nickel hydrogenation catalyst, under hydrogen pressures in excess of 1500 p.s.i.a., and at temperatures of at least 100° C., in two distinct steps, the first being alkaline and proceeding until essentially all fructose present in the inverted sugar is hydrogenated, and the second acidic which proceeds until essentially all sugars present have been converted to their corresponding sugar alcohols. The feed invert sugar is predominantly from sucrose, which is equivalent to cane or beet sugar. Whereas sugar used without the prefix invert is any sugar.

The two steps of this process, that is alkaline and then acidic, are critical to the carrying out of the objects of the invention; i.e., increased mannitol production with no loss in reaction rate and thus no loss in the rate of production.

The alkaline condition prevalent in the first step (stage) of the reaction may be achieved by adding a strong base, such as an alkaline earth or an alkaline metal hydroxide, to the feed slurry and thus adjusting the pH thereof to at least about 8.0. Said alkalinity can also be accomplished by feeding to the reactor, in a separate stream, sufficient base to achieve the alkaline reaction conditions. The preferred means is alkalinization of the feed slurry. Bases such as sodium hydroxide, calcum hydroxide, lithium hydroxide and potassium hydroxide can be used.

This alkaline stage is then permitted to continue until essentially all of the available fructose has been hydrogenated; that is, at most 4% of the reaction mixture as sampled is fructose. At this point in the progress of the reaction, acid is injected to lower the pH to less than 6.0. This is accomplished by injecting into the reactor an acid, such as sulfuric acid, acetic acid, gluconic acid, propionic or phosphoric acid, or other comparable mineral and organic acids at a predetermined flow rate which is adequate to lower the reaction streams pH to the desired level.

Thus, if a series of stirred tank reactors is used for this process, acid would be fed into a particular reactor as determined by the fructose profile from reactor to reactor. If a pipeline reactor is used, the acid is injected at a point where the fructose is at or below the above level.

The determination of the point for changing from the alkaline to acid stage is made by sampling a particular reactor setup and injecting the acid at the point of the reactor or in the particular reactor where the fructose concentration is proper. This point will vary depending upon normal kinetic variables; that is, temperature, pressure, concentration and residence time. However, once these are set and the acid point determined, the process proceeds with no sampling. The actual portion of the total residence time that any portion of sugar feed spends in the alkaline stage is usually from about 10 to about 60% of said residence time.

The criticality, of these two reaction steps, results from the desire to maximize the mannitol content of the reaction product and minimize unwanted side reactions. The alkaline condition in the first stage causes isomerization of glucose to fructose and sorbitol to mannitol, as well as the formation of unwanted hexitol isomers and some degradation products. When the length of the alkaline stage is limited, as above, the mannitol content of the product will be from 27 to 31 weight percent and side reactions, and thus side products, will be kept to a minimum. As discussed infra, the reaction rate is maintained at high levels throughout the process thus assuring a rapid conversion and high processing speed. The rapid reaction is made possible by keeping the temperature at high levels in the alkaline and acid stages. That temperature has this effect is predicted by the simple first order knetic relationships of reaction rate and the Arrhenius equation; i.e., $r=KCK\alpha e^{-E/RT}$ where $r$ is reaction rate, K is reaction rate constant, C is concentration, E and R are kinetic constants, and T is absolute temperature. Thus the higher the temperature the faster the reaction rate. However, the fact that we have accomplished this increase and retained the quality of the product is completely against prior teaching.

In previous processes, such as described in U.S. Pat. No. 3,329,729, the temperature had to be maintained at low levels, less than about 80° C., to achieve a good mannitol yield and product; thus, by reason of the simple kinetics shown above, limiting the reaction rate and the processing rate. To persons skilled in the chemical processing art the economic advantages of the increased speed of the present reaction will be obvious and the advance in the processing art equally clear. To achieve the rapid rate the reaction is always maintained above 100° C. For the type of reaction rates at which commercial production is made economically feasible, the temperature range is maintained from about 120° C. to about 190° C. The lower limit only denoting the temperature needed to achieve a reasonable hydrogenation rate and the upper limit merely denoting a level beyond which an increase in temperature, and thus reaction rate, would cause control of the reaction to become difficult. A preferred temperature range for practicing this invention to gain the high reaction rate and retain good control is from about 140 to about 170° C.

The hydrogen pressure at which the reaction is performed should be in excess of about 1500 p.s.i.a. This is to ensure proper hydrogen contact with the sugar and to achieve proper reaction rates, since the reaction is pressure sensitive. Pressures above 3000 p.s.i.a. would be excessive and not particularly aid the progress of the reaction and would no doubt cause an undue increase in the cost of the processing equipment; a preferred span for pressure would be from about 1600 p.s.i.a. through about 2400 p.s.i.a.

The nickel hydrogenation catalysts which can be used in the practice of this invention are finely divided Raney nickel, and reduced supported nickel catalyst. The concentration of the catalyst based on sugar will usually be from about 0.4 to 2.0 weight percent of nickel. At concentrations below about 0.4% the reactions will proceed to slowly or not properly and concentrations above about 2.0% would be excessive, and could cause processing problems due to settling of catalyst. A preferred range of catalyst would be from 0.6 to 1.1 weight percent of nickel.

The inverted sucrose solution itself can vary in concentration from about 25 to about 75 weight percent sugar with a preferred range of 40 to 60 weight percent sugar. The pH of the feed solution-slurry is maintained above 8 and usually below 12 with a preferred upper limit of about 10.

A preferred embodiment of the subject process is carried out by dissolving an inverted sugar, which is from about 85 to about 97 weight percent, preferably 90% as can be seen from Example I, monosaccharide, to form a 60 weight percent aqueous sugar solution, adding to this solution from about 0.006 to about 0.011 pound of nickel, in the form of a reduced supported nickel catalyst, per pound of sugar and then adjusting the pH of this slurry, with sodium or calcium hydroxide, from about 8 to about 10, and feeding this slurry continuously to a series of stirred tank-type reactors. (The term "feeding this slurry continuously" is used merely to distinguish this from a batch or semi-batch process and includes not only a steady volumetric or weight flow, but also semi-continuous pulse feed, and functional feed such as a sinusoidal flow pattern.) Within this reactor the slurry is subjected to a hydrogen pressure of about 1600 to 2400 p.s.i.a., temperatures of about 140 to 170° C., and contacted with hydrogen until at most 2 weight percent of the fructose charged is unreacted in a reactor. To the next reactor in series, usually the second or third reactor, sulfuric, acetic, gluconic or citric acid is continually added to bring the pH down to below 6.0. The reaction is continued until at most 0.8 weight percent of the non-catalyst solids are sugars.

To enable those skilled in the art to more easily practice this invention the following nonlimiting examples are given. The term "inverted sugar" as used in this example is limited to predominantly from sucrose as explained supra.

EXAMPLE 1

To a 50% aqueous solution of 98% inverted sucrose is added a reduced supported nickel catalyst in a ratio of .006 pound of nickel per pound of sugar and .001 pound of sodium hydroxide per pound of sugar. The pH of the resultant feed slurry is 9.0. This sugar slurry is fed to a series of five bubble-stirred tank reactors at a rate of 19 liters per hour which results in a residence time of about 27 minutes per reactor. These reactors are maintained at a hydrogen pressure of 2000 p.s.i.a. The first reactor is maintained at 160° C. As the product of the first reactor enters the second reactor it is mixed with an acid stream which contains an acetic acid solution at a concentration sufficient to yield .0015 pound of acetic acid per pound of sugar in the feed slurry which results in a pH in the reactor of 4.8. The second through fifth reactor, i.e., the last reactor, are maintained at 160° C. The resultant mixture of polyhydric alcohols is low in organic volatiles and total residual sugars and contains 30.4 weight percent mannitol based on organic solids.

EXAMPLE 2

Per the procedure of Example 1, a sugar slurry comprising a 50% aqueous inverted sucrose solution, .006 pound of nickel as a reduced supported nickel catalyst per pound of sugar and .0015 pound of sodium hydroxide per pound of sugar, resulting in a pH of 9.3 in said slurry, is fed to the reactors at 19 liters per hour at an identical hydrogen pressure. Temperature profile is 165° C. in the first reactor and 160° C. in the remaining four reactors. An acetic acid solution, which results in .0023 pound of acetic acid per pound of sugar in the initial feed, is continuously fed to the second reactor per Example 1 bringing the pH of the second reactor to 4.5. The resulting product contains 29.4% of mannitol.

EXAMPLE 3

Per the procedure of Example 1 a sugar slurry which is comprised of a 50% inverted sugar solution, .006 pound of nickel as a reduced supported nickel catalyst per pound of sugar and .002 pound of sodium hydroxide per pound of sugar at a pH of 9.4 is continuously fed at 19 liters per hour to a series of 5 reactors maintained at 160° C. and 2000 p.s.i.a. hydrogen pressure. Per Example 1 the slurry is mixed in the second reactor with an acid stream containing sufficient acetic acid to result in a concentration of acetic acid of .0035 pound per pound of sugar in feed, resulting in a pH of 4.6 in the second reactor. The product contains 30.2% mannitol.

EXAMPLE 4

Per the procedure of Example 1, a sugar slurry comprising 50% inverted aqueous sucrose solution, .006 pound of nickel as a reduced supported nickel catalyst per pound of sugar, and .002 pound of sodium hydroxide per pound of sugar resulting in a pH of 9.3 in said sugar slurry is fed to the reactors at 19 liters per hour at the same hydrogen pressure. Temperature profile is 165° C. in the first reactor and 160° C. in the remaining four reactors. The acetic acid solution, which results in .003 pound of acetic acid per pound of sugar in the initial feed, is continuously fed to the second reactor per Example 1 bringing the pH of the second reactor to 4.7. The resulting product contains 30.7% of mannitol.

EXAMPLE 5

Per the procedure of Example 1, a sugar slurry comprising a 50% inverted sucrose solution, .006 pound of nickel as a reduced phosphorus promoted nickel catalyst per pound of sugar and .001 pound of sodium hydroxide per pound of sugar resulting in a pH of 9.1 in this sugar slurry is fed to the reactors at 19 liters per hour and 2000 p.s.i.a. hydrogen pressure. Temperature profile is 170° C. in the first reactor and 160° C. in the remaining four reactors. A phosphoric acid solution which results in .0008 pound of phosphoric acid per pound of sugar in the initial feed is continuously fed to the second reactor per Example 1 bringing the pH of the second reactor to 4.4. The resulting product contains 27.3% mannitol.

EXAMPLE 6

Per the procedure of Example 1, a sugar slurry comprising 50% inverted sucrose solution, .006 pound of nickel as a reduced phosphorus promoted nickel catalyst per pound of sugar and .001 pound of sodium hydroxide per pound of sugar resulting in a pH of 9.3 in this sugar slurry is fed to the reactors at 19 liters per hour and at a 2000 p.s.i.a. hydrogen pressure. Temperature profile is 175° C. in the first reactor and 160° C. in the remaining four reactors. A phosphoric acid solution which results in .0008 pound of phosphoric acid per pound of sugar in the initial feed is continuously fed to the second reactor per Example 1 bringing the pH of the second reactor to 4.6. The resulting product contains 27.5% mannitol.

EXAMPLE 7

Per the procedure of Example 1, a sugar slurry containing a 45% solution of inverted sugar, .0015 pound of lithium hydroxide per pound of sugar, and .01 pound of reduced supported nickel catalyst per pound of sugar is fed at a rate of 24 liters per hour to the first autoclave which is at a temperature of 165° C. The autoclaves are maintained at about 1800 p.s.i.a. of hydrogen. The second autoclave is also maintained at 165° C. To the third reactor, which is maintained at 170° C., is continuously added an acid stream containing sulfuric acid at a concentration resulting in .0009 pound of sulfuric acid per pound of sugar in the feed. The remaining reactors are maintained at 170° C.

EXAMPLE 8

Per the procedure of Example 1, a sugar slurry containing a 70% aqueous solution of inverted sugar and .0005 pound of calcium hydroxide per pound of sugar, and .015 pound of reduced supported nicked catalyst per pound of sugar is fed at a rate of 15 liters per hour to the first autoclave which is at a temperature of 170° C. The second autoclave is maintained at 165° C. To the second reactor which is maintained at 170° C. is continuously added an acid stream containing sulfuric acid at a concentration resulting in .0015 pound of sulfuric acid per pound of sugar in the feed. The remaining reactors are maintained at 170° C. The hydrogen pressure is maintained throughout at 2300 p.s.i.a.

EXAMPLE 9

Per the procedure of Example 1, a sugar slurry containing a 50% aqueous solution of inverted sugar, .0015 pound of sodium hydroxide per pound of sugar, and .02 pound of reduced supported nickel catalyst per pound of sugar is fed at a rate of 27 liters per hour to the first autoclave, which is maintained at 180° C. The second autoclave is maintained at 170° C. To the third reactor, which is maintained at 165° C., is continuously added an acid stream containing sulfuric acid at a concentration resulting in .009 pound of sulfuric acid per pound of sugar in the feed. The remaining reactors are maintained at 165° C., and all the reactors are maintained at a hydrogen pressure of 2100 p.s.i.a.

What is claimed is:

1. A process for producing mannitol which comprises reacting an aqueous solution consisting essentially of from about 25 to 75 weight percent of partially inverted sucrose containing from about 85 to 98 weight percent monosaccharide, slurried with a nicked hydrogenation catalyst in a proportion of about 0.006 to 0.020 pound of nickel per pound of said invert sugar, with hydrogen, and a pressure in excess of 1500 p.s.i.a. and at a temperature of at least 100° C., in two distinct steps, the first step being at an alkaline feed pH of above 8 and below 12 and the second step being at an acidic pH of less than about 6, said first step continuing until essentially all the fructose present in the said partially inverted sucrose has been hydrogenated, said second step continuing until essentially all the sugar present has been hydrogenated, and the total residence time that any portion of sugar feed spends in the alkaline stage is from about 10 to about 60 percent of the total residence time.

2. A process according to claim 1 wherein the alkalinity in the first step is provided by adding a base selected from the group consisting of alkaline earth metal hydroxides and alkali metal hydroxides, to the partially inverted sucrose-catalyst slurry.

3. A process according to claim 1 wherein the acidic condition during the second step is provided by adding a mineral acid or an organic acid selected from the group consisting of acetic acid, gluconic acid, propionic acid, and citric acid and wherein the partially inverted sucrose is 98% inverted sucrose.

4. A process according to claim 1 wherein the reaction is carried out in a series of stirred tank continuous reactors and the alkaline step is continued for from 10 to 60% of the total process residence time.

5. A process of claim 2 wherein the pH of the partially converted sucrose-catalyst slurry is from above 8 to 10.

6. The process according to claim 4 wherein the temperature is between about 140 and 170° C., the hydrogen pressure is from 1600 to 2400 p.s.i.a., and the concentration of said partially inverted sucrose is from about 40 to 60 weight percent of the aqueous solution.

7. A process of claim 1 wherein the pressure is from in excess of 1500 and not more than 3000 p.s.i.a. and the temperature is from about 120 to 190° C.

8. A process according to claim 1 wherein the alkaline solution in the first step is immediately acidulated upon the fructose level being dropped to not more than 4% by weight.

9. A process of claim 2 wherein the acid is selected from the group consisting of sulfuric acid, acetic acid, gluconic acid, propionic acid, citric acid, and phosphoric acid.

10. A process of claim 6 wherein the alkalinity in the first step of the process is provided by adding a base selected from the group consisting of alkaline earth metal hydroxide and alkali metal hydroxides and acidic conditions in the second step of the reactions is provided by an acid selected from the group consisting of sulfuric acid, acetic acid, phosphoric acid, citric acid, propionic acid, and gluconic acid.

References Cited
UNITED STATES PATENTS

| | | | |
|---|---|---|---|
| 3,329,729 | 7/1967 | Brandner et al. | 260—635 C |
| 2,642,462 | 6/1953 | Kasehagen | 260—635 C |
| 2,759,024 | 8/1956 | Kasehagen et al. | 260—635 C |
| 1,990,245 | 2/1935 | Mueller et al. | 260—635 C |

FOREIGN PATENTS

| | | | |
|---|---|---|---|
| 1,025,813 | 9/1966 | Great Britain | 260—635 C |

BERNARD HELFIN, Primary Examiner

J. E. EVANS, Assistant Examiner